United States Patent Office 2,706,737
Patented Apr. 19, 1955

2,706,737

RECOVERY OF GLUTAMIC ACID

Earl V. Cardinal, Deerfield, Ill., assignor to International Minerals & Chemical Corporation, a corporation of New York No Drawing. Application December 16, 1953,
Serial No. 398,626

9 Claims. (Cl. 260—527)

The instant invention relates to processes for the recovery of glutamic acid from materials containing it. More particularly, it relates to the separation of glutamic acid from liquors from beet sugar molasses from which sugar has been partially or wholly removed, such as from Steffen's filtrates.

Glutamic acid is produced from liquors from beet sugar molasses from which sugar has been partially or wholly removed, for example by fermentation or by precipitation as an alkaline earth metal saccharate. Numerous processes are known for recovering glutamic acid from these materials and involve the hydrolysis of the raw material to produce a hydrolysate containing glutamic acid, and separation of impurities from the hydrolysate prior to crystallization of glutamic acid.

For example, U. S. 2,519,573, issued to Hoglan, describes the recovery of glutamic acid from Steffen's filtrate. This process involves precipitating and separating inorganic sulfates from the Steffen's filtrate, hydrolyzing the Steffen's filtrate, concentrating the resulting hydrolysate, and adjusting its pH to about 1.6, at which point inorganic salts are precipitated and removed. The pH of the resulting solution is adjusted to about 3.2, and glutamic acid is crystallized from the adjusted solution.

It is an object of the instant invention to provide improved processes for the recovery of glutamic acid from hydrolysates containing it.

It is a further object of the instant invention to provide improved processes for recovering high yields of glutamic acid from Steffen's filtrate hydrolysates containing it.

It is a further object of the instant invention to provide extraction processes for the recovery of improved yields of high-grade glutamic acid from Steffen's filtrate hydrolysates containing it.

These and other objects of the instant invention will become more apparent as hereinafter described.

It has been discovered that the glutamic acid present in hydrolysates is substantially completely soluble in certain aqueous organic solvents under conditions as herein described, and that a large portion of the non-glutamic acid constituents of the hydrolysates are insoluble and are separated from the resulting glutamic acid-containing solution. Glutamic acid is recovered from the resulting extract.

More specifically, glutamic acid, as the hydrochloride salt, is separated from a hydrolysate by extraction with an aqueous organic solvent. The organic solvent is selected from the group consisting of isopropyl alcohol and tertiary butyl alcohol. A composition comprising water, the alcohol, and glutamic acid hydrochloride in which the ratio of water to alcohol is between about 20:80 and about 3:97 is prepared. For example, sufficient alcohol is admixed with a Steffen's filtrate hydrolysate to obtain the composition. The glutamic acid hydrochloride-containing alcoholic phase is separated from the remaining phase containing non-glutamic acid constituents.

These aqueous alcoholic compositions are especially suited for the recovery of glutamic acid hydrochloride from hydrolysates because they dissolve substantially all of the glutamic acid as the hydrochloride salt, and dissolve a minimum of the various impurities present in the crude solutions, such as Steffen's filtrate hydrolysates.

Glutamic acid is recovered from the alcohol solution by any convenient method. For example, the alcohol is separated by evaporation, and the glutamic acid crystallized from the aqueous residue. Higher yields of glutamic acid are obtained by the instant process because the liquor from which the glutamic acid is crystallized can be concentrated to a greater extent than can hydrolysates which contain a greater percentage of impurities. For this reason, not as much glutamic acid remains in the liquor after crystallization of glutamic acid as remains in conventional glutamic acid end liquors after the glutamic acid has been crystallized from the hydrolysate.

In carrying out a specific embodiment of the instant invention, concentrated Steffen's filtrate is hydrolyzed, for example with a mineral acid, such as hydrochloric acid. Any humin formed during the hydrolysis is separated from the hydrolysate, for example by filtration. The resulting hydrolysate is neutralized, preferably to a pH between about 0.5 and about 1.5 to produce the glutamic acid hydrochloride. The resulting hydrolysate is then concentrated, and sufficient isopropyl alcohol is added to the concentrated hydrolysate to produce a composition in which the ratio of alcohol to water is between about 80:20 and about 97:3 by weight. The resulting suspension is thoroughly mixed or stirred, and the glutamic acid hydrochloride-containing alcoholic phase is separated from the solid material containing the non-glutamic acid constituents. The solution from which the solid material has been separated contains between about 95% and about 100% of the original glutamic acid present in the raw material.

In another specific embodiment of the instant invention, a liquor from beet sugar molasses from which sugar has been wholly or partially removed, such as concentrated Steffen's filtrate, is hydrolyzed with a concentrated mineral acid, such as about 26% aqueous hydrochloric acid by heating under autogenous pressure at a temperature of about 120° C. for a period of between about 2½ hours and about 3 hours. The resulting hydrolysate is adjusted to a pH between about 0.5 and about 1.5 with a base, for example with ammonia. Any insoluble material formed is separated from the hydrolysate, for example by filtration. The resulting solution is concentrated to between about 20% and about 30% water content, preferably to about 25% water content, and sufficient isopropyl alcohol is added to the concentrated hydrolysate to produce a composition, the liquid portion of which comprises between about 3% and about 20% by weight water and between about 97% and about 80% by weight of the alcohol. Although isopropyl alcohol or tertiary butyl alcohol, can be employed in practicing the instant invention, isopropyl alcohol is the preferred solvent. The resulting suspension is thoroughly mixed, and solid material is separated from the glutamic acid-containing solution, for example by filtration.

Glutamic acid is recovered from the solvent solution from which the solids have been separated. In one embodiment of the instant invention, the alcohol is removed from the extract by evaporation, and the aqueous solution remaining which contains the glutamic acid is adjusted to a pH between about 4.5 and about 5.5, decolorized, and then concentrated to precipitate inorganic salts and impurities which are separated by filtration. The resulting solution, from which the impurities have been separated, is adjusted to a pH between about 2.5 and about 3.5, preferably about 3.2, and the glutamic acid crystallizes and is separated from the liquor.

Another method for the recovery of glutamic acid from the extract solution involves the precipitation of the glutamic acid as an alkaline earth metal glutamate and the recovery of glutamic acid from the glutamate salt. For example, the glutamic acid-containing extract is adjusted with calcium hydroxide, barium hydroxide, or magnesium hydroxide to a pH between about 6.0 and about 11.0, preferably about 7.0. The adjusted suspension is heated to a temperature between about 40° C. and about 100° C., preferably about 65° C., and upon cooling a large portion of the impurities remain dissolved in the solution. It has been found that substantial amounts of impurities stay in solution when this preliminary heating step is employed prior to separation of the solid glutamate salt. The glutamate salt which crystallizes is separated from the solution, for example by filtration, and glutamic acid is recovered therefrom by any conventional method.

The instant invention is applicable to the recovery of glutamic acid from hydrolysates of liquors of beet sugar molasses from which the sugar has been partially or wholly removed, such as Steffen's filtrate, vinasse, schlempe, beet molasses residues, and the like.

The following examples are presented in order to afford a clearer understanding of the practice of the instant invention, but it is understood that they are illustrative only and there is no intention to limit the invention thereto.

Example I

About 333 pounds of Steffen's filtrate was hydrolyzed with hydrochloric acid by adding about 266 pounds of about 37% aqueous hydrochloric acid, and the resulting mixture was refluxed for about 3 hours. Sufficient ammonia was added to the resulting hydrolysate to adjust the pH to about 0.5. The resulting solution was concentrated in a vacuum to about 25% water content, and about 795 pounds of isopropyl alcohol was added to the concentrated hydrolysate. The weight ratio of the alcohol to water in the resulting solution was about 9:1. The suspension was mixed thoroughly, and solids were separated from the resulting suspension by filtration.

Isopropyl alcohol was separated from the solution containing glutamic acid by evaporation and distillation. Sufficient sodium hydroxide was added to the resulting aqueous solution to obtain a pH of about 5.0. The adjusted solution was decolorized with about 15 pounds of carbon, and the decolorized solution was concentrated to about 50% solids content. Insoluble material was separated from the concentrated solution by filtration. The resulting solution was then adjusted to a pH of about 3.2 with hydrochloric acid, and the glutamic acid which crystallized was separated by filtration. The yield of glutamic acid was about 90%, and the purity about 40%. Upon recrystallization, the purity increased to about 98%, and the yield of glutamic acid was about 81%.

Example II

A composition containing glutamic acid hydrochloride, water and isopropyl alcohol was prepared as described in Example I. The solid material was separated from the solution by filtration, and the filtrate was adjusted with lime to a pH of about 7.0. The resulting suspension was heated to about 65° C., and solid calcium glutamate was separated from the solution by filtration. The glutamate was dissolved in water, and the resulting solution was adjusted with about 1 molar aqueous sodium carbonate to a pH of about 9.0. The resulting calcium carbonate precipitate is separated by filtration, and the filtrate was adjusted to a pH of about 5.0. The inorganic cake was separated by filtration, and the filtrate was adjusted to a pH of about 3.2 with about 37% aqueous hydrochloric acid. The glutamic acid which crystallized was separated by filtration. The yield of crude glutamic acid was about 92% and was of 40% purity. Recrystallization of the glutamic acid raised the purity to about 98%, with a yield of about 80%.

Having thus fully described and illustrated the character of the instant invention, what is desired to be protected by Letters Patent is:

1. A process for the recovery of glutamic acid from crude solutions containing it which comprises preparing a composition comprising glutamic acid hydrochloride, water and a solvent selected from the group consisting of isopropyl alcohol and tertiary butyl alcohol in which the weight ratio of water to alcohol is between about 20:80 and about 3:97, separating solid material from the resulting glutamic acid-containing solution, and separating glutamic acid from the resulting glutamic acid-containing solution.

2. A process for the recovery of glutamic acid which comprises admixing a hydrolysate containing glutamic acid hydrochloride and sufficient solvent selected from the group consisting of isopropyl alcohol and tertiary butyl alcohol, to produce a composition comprising glutamic acid hydrochloride, water, and alcohol in which the weight ratio of water to alcohol is between about 20:80 and about 3:97, separating solid material from the resulting glutamic acid-containing solution, and separating glutamic acid from the resulting glutamic acid-containing solution.

3. A process for the recovery of glutamic acid which comprises admixing a Steffen's filtrate hydrolysate containing glutamic acid hydrochloride with sufficient solvent selected from the group consisting of isopropyl alcohol and tertiary butyl alcohol to produce a composition comprising glutamic acid hydrochloride, water and alcohol in which the weight ratio of water to alcohol is between about 20:80 and about 3:97, separating solid material from the resulting suspension, and separating glutamic acid from the resulting glutamic acid-containing solution.

4. A process for the recovery of glutamic acid which comprises admixing a Steffen's filtrate hydrolysate containing glutamic acid hydrochloride with sufficient isopropyl alcohol to product a composition comprising glutamic acid hydrochloride, water and alcohol in which the weight ratio of water to alcohol is about 1:9, separating solid material from the resulting suspension, and separating glutamic acid from the resulting glutamic acid-containing solution.

5. A process for the recovery of glutamic acid which comprises admixing a hydrolysate containing glutamic acid hydrochloride, and sufficient solvent selected from the group consisting of isopropyl alcohol, and tertiary butyl alcohol, to produce a composition comprising glutamic acid hydrochloride, water and alcohol in which the weight ratio of water to alcohol is between about 20:80 and about 3:97, agitating the resulting suspension, separating solid material from the glutamic acid-containing alcohol solution, removing alcohol from said glutamic acid-containing solution, adjusting the pH of the resulting aqueous solution to between about 4.5 and about 5.5, separating impurities from the neutralized solution, adjusting the pH of the resulting solution to between about 2.5 and about 3.5, and separating the glutamic acid which crystallizes therefrom.

6. A process for the recovery of glutamic acid which comprises admixing a Steffen's filtrate hydrolysate containing glutamic acid hydrochloride and sufficient isopropyl alcohol to produce a composition comprising glutamic acid hydrochloride, water and alcohol in which the weight ratio of water to alcohol is between about 20:80 and about 3:97, agitating the resulting suspension, separating solid material from the glutamic acid-containing solution, evaporating the alcohol from the glutamic acid-containing solution, adjusting the pH of the resulting aqueous solution to between about 4.5 and about 5.5, decolorizing the neutralized solution, concentrating the decolorized solution, separating the insoluble inorganic salts which crystallize, adjusting the pH of the resulting solution to between about 2.5 and about 3.5, and separating the glutamic acid which crystallizes therefrom.

7. A process for the recovery of glutamic acid which comprises admixing a Steffen's filtrate hydrolysate containing glutamic acid hydrochloride and sufficient organic solvent selected from the group consisting of isopropyl alcohol and tertiary butyl alcohol, to produce a composition comprising glutamic acid hydrochloride, water and alcohol in which the weight ratio of water to alcohol is between about 20:80 and about 3:97, agitating the resulting suspension, separating solid material from the glutamic acid-containing phase, neutralizing the glutamic acid-containing phase with an alkaline earth metal hydroxide, heating the neutralized solution to a temperature between about 40° C. and about 100° C., and crystallizing and separating the resulting insoluble alkaline earth metal glutamate from the resulting solution.

8. A process for the recovery of glutamic acid which comprises admixing a Steffen's filtrate hydrolysate containing glutamic acid hydrochloride and sufficient organic solvent selected from the group consisting of isopropyl alcohol and tertiary butyl alcohol, to produce a composition comprising glutamic acid hydrochloride, water and alcohol in which the weight ratio of water to alcohol is between about 20:80 and about 3:97, agitating the resulting suspension, separating solid material from the glutamic acid-containing phase, neutralizing the glutamic acid-containing phase with an alkaline earth metal hydroxide, heating the neutralized solution to a temperature between about 40° C. and about 100° C., separating the resulting insoluble alkaline earth metal glutamate from the resulting solution, dissolving said glutamate in water, and crystallizing and separating glutamic acid from the resulting solution.

9. A process for the recovery of glutamic acid which comprises admixing a Steffen's filtrate hydrolysate containing glutamic acid hydrochloride and sufficient isopropyl alcohol to produce a suspension, the liquid portion of which contains about 90% isopropyl alcohol and about 10% water by weight, agitating the resulting suspension, separating solid material from said suspension, neutralizing the resulting glutamic acid solution with calcium hydroxide, heating the neutralized suspension to a temperature between about 40° C. and about 100° C., separating the resulting insoluble calcium glutamate from the suspension, dissolving the calcium glutamate in water, and crytsallizing and separating glutamic acid from the resulting solution.

No references cited.